Nov. 3, 1953
E. R. WILLIAMS
OIL TREATING APPARATUS HAVING
SETTLING TANK HEATING MEANS
2,658,025
Filed Nov. 14, 1949
2 Sheets—Sheet 1
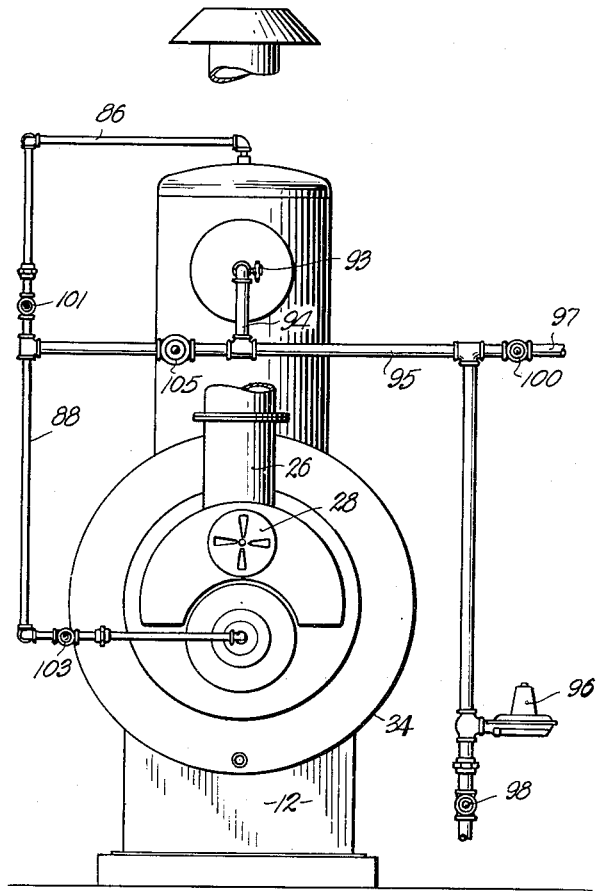
Fig. 1.
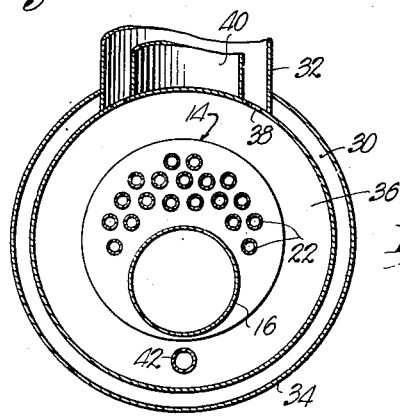
Fig. 3
Fig. 4.
INVENTOR.
Elmer R. Williams
BY
ATTORNEY.

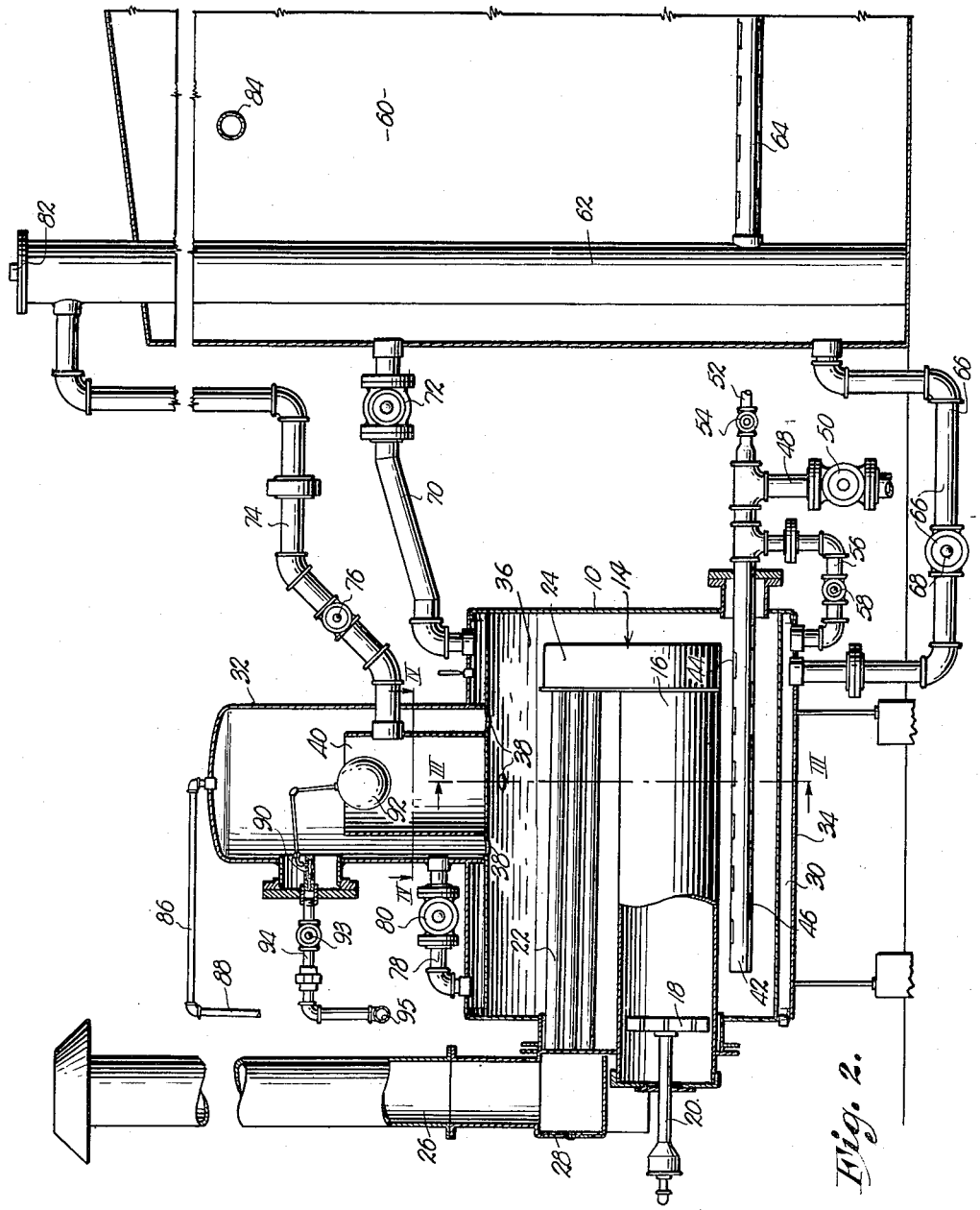

Patented Nov. 3, 1953

2,658,025

UNITED STATES PATENT OFFICE 2,658,025

OIL TREATING APPARATUS HAVING SETTLING TANK HEATING MEANS

Elmer R. Williams, Springfield, Mo., assignor to Shropshire-O'Neill Tank Company, Great Bend, Kans.

Application November 14, 1949, Serial No. 127,229

7 Claims. (Cl. 196—5)

1

This invention relates to the field of petroleum and the treatment thereof, particularly to remove water, the primary object being to combine with the initial water extraction assembly, settling structure wherein the removed water in the latter is maintained in a heated condition by parts of said assembly.

Many differing procedures and assemblies are presently used in the field of petroleum for removing water from such products. It is quite common, for instance, to wash the petroleum in salt water immediately upon initial pumping and to treat the same chemically, if necessary, at the same time to remove all water therefrom prior to conveyance of the water-free product to storage tanks. While such apparatus is entirely satisfactory for the most part, nevertheless, it is expensive and not always within the means of smaller operators.

Another method of treating petroleum constitutes the initial water bath to remove a great portion of the water, including free water, from the products as the same emanate from the well and to thereupon direct the petroleum products to settling tanks where, after a period of time, water-free petroleum can be removed, and the settled salt water passed to disposal. This last-mentioned procedure also is satisfactory from the point of removing water but has the distinct disadvantage of being time-consuming.

It is the most important object of the present invention, therefore, to provide apparatus and a method of treating petroleum products wherein the hot water bath procedure is combined with the settling process in such a manner as to enhance the speed of the latter and free the products of water in a single operation for final conveyance to the storage tanks.

Another important object of the present invention is to provide a water removal bath for petroleum products including a body of water, through which the products are directed, that is maintained in a heated condition, and, to additionally provide a settling tank wherein the water thereof is recirculated into heat exchange relationship with respect to the water in the bath assembly, whereby the speed of settling is tremendously increased.

Another object of the present invention is to provide a drum having a main body portion of heated water through which the products to be treated are permitted to bubble, and a shell connected with a settling tank for free circulation, whereby the water in the settling tank is maintained in a heated condition for presenting a second bath for the products and a water removal therefor, with a resultant water-free product to be stored or otherwise disposed of.

A further object of the present invention is to provide oil treating structure capable of adjustment in a number of differing manners, dependent upon the rate of flow of the products being treated and the speed in which it is desired to remove water therefrom.

Other objects of this invention include the way in which the water of the settling tank may be easily and quickly reheated after shut-down prior to pumping operations; the way in which heating means common to the two water removal assemblies is provided; the way in which gases and vapors emanating from the products are saved and utilized in firing the heating furnace; and the way all gases and vapors containing water are removed from the product, to the end that when the same is conveyed to the storage tanks, it is virtually water-free.

In the drawings,

Fig. 1 is an end elevational view of one of the assemblies of apparatus having settling tank heating means for the treatment of oil made in accordance with my present invention and capable of carrying out the method hereof.

Fig. 2 is substantially central, vertical, cross sectional view through the two primary assemblies of the apparatus, parts thereof being in elevation.

Fig. 3 is a detailed, fragmentary, cross sectional view taken on line III—III of Fig. 2; and Fig. 4 is a transverse, cross sectional view taken on line IV—IV of Fig. 2.

A hollow, horizontally-disposed drum or boiler 10 is supported upon any suitable base such as at 12 and has disposed therewithin a furnace broadly designated by the numeral 14 and preferably of the kind capable of burning gases and vapors. Furnace 14 includes an elongated, tubular member 16 within which is disposed a burner 18 connected with a pipe 20 extending outwardly beyond one end of the tube 16. As shown in Fig. 2, tube 16, in turn, has said one end thereof projecting beyond the drum 10.

A plurality of elongated, horizontally-disposed, spaced pipes 22 communicate with the innermost end of the tube 16 by means of a hollow head 24, said pipes 22, also, extending outwardly beyond the normally front end of drum 10 for connection with a flue 26 which is, in turn, provided with a damper 28.

Drum 10 is of double-wall construction to present a jacket and a completely-circumscribing compartment 30. An upstanding cylinder 32 carried by the drum 10 projects through the outer shell 34 forming compartment 30 and is placed into communication with the inner compartment 36 of drum 10 by means of a plurality of openings 38 (Figs. 2 and 4). Cylinder 32 is otherwise closed and is provided with a short receptacle 40 therewithin that is, in turn, open at its top. The inner wall of drum 10 serves as a closure for the bottom of receiver 40, and the latter has a diameter appreciably less than the diameter of cylinder 32.

An elongated, tubular manifold or spreader 42 extends into the drum 10 immediately below the tube 16 of furnace 14, said spreader 42 being provided with a series of slots 44 adjacent the top thereof and a second series of slots 46 disposed along its bottom face. A conduit 48 connected with the spreader 42 exteriorly of drum 10 has a control valve 50 interposed therein and extends to the well or wells being pumped when the apparatus hereof is placed in use. A second conduit 52, also having a valve 54 therein, registers with the spreader 42 and may lead to other sources of petroleum products to be treated (not shown).

Thus, when all pumps are shut down and no wells are in operation, the assembly hereof may be used to remove water from petroleum products previously pumped and in storage by closing valve 50 and opening valve 54.

Conduit 48, also, communicates with the outer compartment 30 of drum 10 through the medium of a pipe 56 provided with a shut-off valve 58. A settling tank broadly designated by the numeral 60 is provided with an elongated, tubular stack 62 extending thereabove as shown in Fig. 2 and having a laterally-extending, substantially horizontal spreader 64 registering therewith in spaced relationship with respect to the bottom of tank 60. Spreader 64 is of the same character as spreader 42.

Tank 60 communicates near its lowermost end with outer compartment 30 of drum 10 by means of a pipe 66 provided with a valve 68. It is to be noted that both pipes 56 and 66 empty into the compartment 30 at the bottom thereof. Tank 60 is, also, provided with a conduit 70, valved as at 72, and extending therefrom intermediate its top and bottom. Conduit 70, in turn, registers with the compartment 30 adjacent the top of the latter.

A pipe 74 provided with a check valve 76 interconnects stack 62 at that end thereof exteriorly of tank 60 with receiver 40 spaced below the top of the latter after passing through cylinder 32. The cylinder 32 has connection near the bottom thereof with the compartment 30 at its uppermost end by means of a pipe 78 having a valve 80 therein. The stack 62 has a pipe 82 in the top thereof that may extend to atmosphere or to storage means if desired, for purposes hereinafter to be made more clear. Tank 60 has an outlet opening 84 for connection with stock tanks (not shown).

The cylinder 32 has a pipe 86 leading from the top thereof for connection with pipe 20 of burner 18 by means of a pipe 88. A valve 90 controlled by a float 92, extending into the receiver 40, is interposed within a line 94 communicating at one end thereof with cylinder 32. Line 94, having a valve 93, joins with a branch 95 having a pressure regulator 96 and a valve 98 and connecting with a source of gases and vapors (not shown).

Branch 95 has a lead 97 to atmosphere provided with a valve 100, and joins with pipe 88. Valves 101 and 103 are disposed in pipe 88, one on each side of branch 95, and a valve 105 is disposed in branch 95 between pipe 88 and line 94.

Assuming the assembly to be in a shut-down condition and the user being desirous of commencing operation, valves 58, 68, 72 and 80 are opened while valves 50 and 54 remain closed and salt water is pumped into tank 60 to remove all air in the treater, and until the level of such water is approximately one foot above the upper end of conduit 70. Gas is fed by opening valve 98 and burner 18 is lighted to heat furnace 14 and to thereupon heat salt water contained within compartments 30 and 36 of drum 10. If burner 18 is fed from an auxiliary source, valves 93, 100 and 101 may all be closed while valves 98, 103 and 105 are opened. Feeding of burner 18 from cylinder 32 will hereinafter be more fully explained.

Consequently, with liquid in compartment 30 being in heat exchange relationship with the liquid within compartment 36, circulation will commence as soon as water in the compartment 36 becomes heated; and, as circulation continues, all of the liquid in tank 60 will be heated by furnace 14. In order to heat the water in compartment 30 to approximately 130° F., the water in compartment 36 should be heated to substantially 150° F. It is understood, however, that the water in the system, including tank 60 may be heated to any temperature desired and maintained at a desired temperature.

Valves 58 and 80 are thereupon closed. One or more pumps may feed the conduit 48 simultaneously and, as soon as valve 50 is opened, the petroleum products containing water will flow into the compartment 36 of drum 10 via spreader 42. As soon as the petroleum products enter the compartment 36, that is filled with hot salt water, such products will rise and bubble upwardly around the tube 16 and pipes 22 of furnace 14. A water bath will thus result, and, as the products impinge upon the hot outer surfaces of furnace 14, a separation of oil and water will occur.

The products will continue to flow upwardly into the cylinder 32 by way of openings 38 until the level thereof is above the uppermost end of receiver 40, whereupon the same will overflow into receiver 40. The products are normally forced from the cylinder 32 to tank 60 via pipe 74 past check valve 76 by pressure of gases and vapors at the top of cylinder 32 rising from the products passing into cylinder 32. If such pressure is insufficient, the rising liquid level in cylinder 32 will raise float 92 to open valve 90 and thereby admit additional gases and vapors from an auxiliary source through line 94. Float 92 falls and valve 90 closes as the liquid level in cylinder lowers because of flow of the liquid into tank 60. A constant pressure is maintained on the level of liquid in cylinder 32 by operation of float 92 and valve 90.

As the water in compartment 30 circulates with water in tank 60 by means of conduit 70 and pipe 66, the level of such water in tank 60 will gradually rise because of the removal of water from the petroleum products; and the same may be siphoned from settling tank 60 in any suitable conventional manner (not shown).

The petroleum products passing through pipe 74 enter stack 62 and flow therefrom by means of the spreader 64. The level of water in tank 60 being above conduit 70, the petroleum products passing out of spreader 64 will again rise within tank 60 and be washed by the hot water therein. Such petroleum products thereupon are conveyed to the stock tanks virtually free of water by means of the outlet 84. It is to be noted that the relatively light petroleum emanating from the spreaders 42 and 64 will pass from the uppermost series of slots therein, whereas the heavier water particles will settle from spreaders 42 and 64 into the compartment 36 and tank 60 respectively.

The above operation may or may not be satisfactory, depending on the amount of oil being pumped into the system through valves 50 and/or 52. A large number of wells may be operating simultaneously at the beginning of operations and be shut down one at a time as a day's limit for instance, has been reached. Further, weather conditions will have a direct effect upon the ease or difficulty of keeping the water in tank 60 sufficiently hot to remove water from the in-coming products.

Accordingly, the operation above described, may be satisfactory even in the coldest weather if only a small amount of the products is being pumped through the system. And, during warm weather, the water in tank 60 can be kept hot even if the volume of throughput is relatively great.

It is therefore, conceivable that when the weather is hot and when a small volume of the products is pumped into the system, valves 68 and 72 could be closed, rendering the recirculating phase hereof inoperable. When valves 68 and 72 are closed, valves 58 and 80 should ordinarily be opened. The products would then flow into compartment 36 via conduit 48 and into compartment 30 past valve 58 and only the petroleum products would be heated by furnace 14. This action takes place by virtue of the fact that the water content of the incoming products entering line 48 past valve 50 is heavier than the oil content thereof and a substantial amount of such free water content will immediately settle from line 48 into line 56 and flow into compartment 30 past valve 58.

However, care must be taken not to direct hot products to cold water in tank 60, for such operation would prevent settling of water from oil in tank 60. If, therefore, for any reason, as above mentioned, water in tank 60 was not being maintained sufficiently hot, valve 72 could be closed and valve 80 opened. The products would then flow from cylinder 32 through pipe 78 instead of pipe 74. Water in compartment 30 would be displaced with the products and flow thereof would be in reverse to tank 60 via valve 68. The products thus dwelling longer, by having to pass through both compartments 30 and 36, would carry more heat to tank 60 and thereby hold water in tank 60 at the desired temperature.

Gases and vapors forming a part of the pumped petroleum products rising within the cylinder 32 above the uppermost edge of receiver 40, are used by conveying the same to the burner 18 by way lines 86 and 88 and pipe 20 with valves 101 and 102 open and valve 105 closed. And, a constant pressure is maintained in cylinder 32 by opening of valve 90 through float 92, as above explained, admitting gases and vapors via lines 94 and 95 when valves 93 and 98 are open.

A relatively large flow of the product through the apparatus may result in an excess of such gases and vapors over and above the require-ments of burner 18. Since such gases and vapors usually contain particles of water, it is desirous to prevent such gases and vapors with their water content from passing into tank 60 with the petroleum products. If such occurred, the finished product in the stock tanks would contain undesired water.

Accordingly, a pressure valve at 100, with a reduction of pressure on regulator 96, set to maintain a predetermined liquid level in cylinder 32, would automatically vent excess gases and vapors to atmosphere or other uses.

Some gases and vapors may be carried into the stack 62 and tank 60 which may be exhausted to atmosphere by pipe 82 or conveyed by the latter to the stock tanks where the same will ultimately condense and admix with the petroleum products therein.

It is seen from the above that an assembly of parts has been provided to increase the speed of water removal from petroleum products by heating the wash water in tank 60. The means for heating the water in drum 10 not only in compartment 36 thereof but in its compartment 30 serves as the heating means for the water of tank 60. Attention is also called to the particular type of furnace 14 provided wherein a relatively large outer surface is provided for receiving the petroleum products and wherein the same constitutes a single unit that may be removed as a body from the drum 10, if desired.

It is clear that all of the aforesaid objects and aims of this invention are fulfilled by the apparatus herein disclosed, together with the method of treating petroleum products to remove water; and it is, therefore, desired to be limited only by the spirit of the invention as defined by the scope of the appended claims.

Having thus described the invention, what is claimed as new and desired to be secured by Letters Patent is:

1. Treating apparatus for petroleum products of the kind having oil and water forming a part thereof, said apparatus comprising a drum having a first compartment and a second compartment disposed to present a jacket surrounding the first compartment; a tank having a water outlet and an oil outlet, the compartments of the drum and said tank all being adapted to contain a quantity of water; means for maintaining the water in the drum heated; structure innerconnecting the tank, the second compartment for free circulation of water therebetween, there being an inlet opening in the first compartment adjacent the bottom thereof for said products directed thereto under pressure; and means for conveying oil in water from the first compartment to said tank and including a cylinder coupled with the first compartment at the top thereof, a hollow oil and water receiver within the cylinder, a pipe joined with the receiver, and a stack poined to the pipe and extending into the tank.

2. Treating apparatus as set forth in claim 2 wherein said stack terminates in an outlet spreader within the tank adjacent the bottom thereof for upward bubbling of the oil emanating from the spreader through the water in the tank.

3. Treating apparatus as set forth in claim 1 wherein is provided means for blocking the passage of water between the tank and the said second compartment thereby rendering such structure inoperable.

4. Treating apparatus as set forth in claim 1 wherein is provided means for conveying to said second compartment free water settling from said petroleum products as the same flow toward inlet opening.

5. Treating apparatus for petroleum products comprising a boiler having a first and a second compartment disposed in heat exchange relationship; a heat generator in said first compartment; means connected with said first compartment for directing said products thereinto; a settling tank adapted for removal of settled water therefrom and having an outlet opening disposed above the settled water to drain oil therefrom; means for transferring said products from the first compartment to the tank; and means including a first pipe interconnecting the tank and said second compartment adjacent the bottoms thereof, and a second pipe connected with the second compartment at the top thereof and joining with the tank between the opening thereof and the first pipe for establishing a free and unrestricted, circulatory path of travel of water therebetween, whereby to transfer heat absorbed by the products in the first compartment to said settled water in the tank, by convection.

6. Treating apparatus as set forth in claim 5 wherein is provided a valved connection between the compartments for transfer of said products from the first compartment to the second compartment.

7. Treating apparatus as set forth in claim 5 wherein said first mentioned means includes a conduit and wherein is provided a valved connection between said conduit and the second compartment and disposed to receive a portion of the free water forming a part of said products as the same flow into the first compartment and direct the same into the second compartment.

ELMER R. WILLIAMS.

References Cited in the file of this patent

UNITED STATES PATENTS

| Number | Name | Date |
|---|---|---|
| 435,198 | Alexander | Aug. 26, 1890 |
| 1,514,118 | Wright | Nov. 4, 1924 |
| 1,547,100 | Daughdrill | July 21, 1925 |
| 2,179,131 | Millard | Nov. 7, 1939 |
| 2,270,412 | Campbell | Jan. 20, 1942 |
| 2,420,115 | Walker et al. | May 6, 1947 |